United States Patent
Haller (10) Patent No.: US 11,345,258 B2
(45) Date of Patent: *May 31, 2022

(54) VEHICLE SEAT WITH LONGITUDINAL ADJUSTMENT DEVICE AND WITH ROTATIONAL ADJUSTMENT DEVICE

(71) Applicant: GRAMMER AG, Ursensollen (DE)

(72) Inventor: Erwin Haller, Birgland (DE)

(73) Assignee: Grammar AG

( * ) Notice: Subject to any disclaimer, the term of this patent is extended or adjusted under 35 U.S.C. 154(b) by 0 days.

This patent is subject to a terminal disclaimer.

(21) Appl. No.: 17/012,301

(22) Filed: Sep. 4, 2020

(65) Prior Publication Data

US 2021/0070197 A1  Mar. 11, 2021

(30) Foreign Application Priority Data

Sep. 6, 2019 (DE) .......................... 102019123960.5

(51) Int. Cl.
*B60N 2/02* (2006.01)
*B60N 2/06* (2006.01)
*B60N 2/14* (2006.01)

(52) U.S. Cl.
CPC .......... *B60N 2/0232* (2013.01); *B60N 2/067* (2013.01); *B60N 2/14* (2013.01);
(Continued)

(58) Field of Classification Search
CPC ........ B60N 2/0232; B60N 2/067; B60N 2/14; B60N 2002/0212; B60N 2002/0216; B60N 2002/022
See application file for complete search history.

(56) References Cited

U.S. PATENT DOCUMENTS 4,351,562 A   9/1982 Twitchell et al.
4,846,529 A   7/1989 Tulley
(Continued)

FOREIGN PATENT DOCUMENTS

CA   2870416    5/2016
DE   69930465   11/2006
(Continued)

OTHER PUBLICATIONS

Official Action for German Patent Application No. 102019123960.5, dated Feb. 11, 2021, 5 pages.
(Continued)

*Primary Examiner* — Philip F Gabler (57) ABSTRACT

The invention relates to a vehicle seat with a lower part for arrangement on a body part of a commercial vehicle and an upper part for storing a seat part, wherein the vehicle seat has a longitudinal adjustment device, by means of which the upper part is displaceable relative to the lower part in the longitudinal direction and/or width direction of the vehicle seat, and a rotational adjustment device working independently of the longitudinal adjustment device, by means of which rotational adjustment device at least parts of the upper part are rotatable relative to the lower part about an axis in the height direction of the vehicle seat, wherein a virtual plane is provided, which is arranged intersectingly parallel to a longitudinal direction and a width direction of the vehicle seat as well as the longitudinal adjustment device and the rotational adjustment device, wherein the longitudinal adjustment device and the rotational adjustment device are designed to be electrically driven.

10 Claims, 9 Drawing Sheets

(52) U.S. Cl.
CPC ............. *B60N 2002/022* (2013.01); *B60N 2002/0212* (2013.01); *B60N 2002/0216* (2013.01)

(56) References Cited

U.S. PATENT DOCUMENTS

| | | | |
|---|---|---|---|
| 6,572,172 B1* | 6/2003 | Ninomiya | B60N 2/0232 |
| | | | 296/65.07 |
| 7,036,883 B1 | 5/2006 | Thompson et al. | |
| 7,059,680 B2 | 6/2006 | Bilger et al. | |
| 7,121,608 B2 | 10/2006 | Bilger et al. | |
| 8,033,605 B2* | 10/2011 | Miura | B60N 2/2893 |
| | | | 297/344.14 |
| 8,827,367 B2* | 9/2014 | Hibi | B60N 2/12 |
| | | | 297/344.24 |
| 9,415,702 B2 | 8/2016 | Auger | |
| 9,579,995 B2* | 2/2017 | Haller | F16C 33/3856 |
| 10,195,964 B2 | 2/2019 | Martin | |
| 11,208,010 B2* | 12/2021 | Haller | B60N 2/146 |
| 2017/0021741 A1* | 1/2017 | Kanehira | B60N 2/067 |
| 2017/0267125 A1* | 9/2017 | Fujita | B60N 2/06 |
| 2019/0100118 A1* | 4/2019 | Rey | F16H 25/20 |
| 2019/0210488 A1* | 7/2019 | Fujita | F16H 1/16 |
| 2021/0070198 A1* | 3/2021 | Haller | B60N 2/146 |

FOREIGN PATENT DOCUMENTS

| | | |
|---|---|---|
| DE | 102007003286 | 7/2008 |
| DE | 102012112523 | 6/2014 |
| DE | 102014201633 | 7/2015 |
| DE | 202017105193 | 9/2018 |
| DE | 102017206941 | 10/2018 |
| DE | 102017112081 | 12/2018 |
| JP | 2002-234368 | 8/2002 |
| WO | WO 2015/066683 | 5/2015 |

OTHER PUBLICATIONS

Extended European Search Report for European Patent Application No. 20192276.2, dated Feb. 10, 2021, 7 pages.
Official Action for German Patent Application No. 102019123964.8, dated May 13, 2020, 3 pages.
Official Action for German Patent Application No. 102019123964.8, dated Sep. 14, 2020, 3 pages.
Extended Search Report for European Patent Application No. 20192278.8, dated Feb. 2, 2021, 7 pages.
Official Action for U.S. Appl. No. 17/012,375, dated May 19, 2021, 9 pages.
Official Action for German Patent Application No. 102019123960.5, dated May 18, 2020, 3 pages.
Official Action for U.S. Appl. No. 17/012,375, dated Nov. 5, 2021, 7 pages.

* cited by examiner

Fig. 3b

VEHICLE SEAT WITH LONGITUDINAL ADJUSTMENT DEVICE AND WITH ROTATIONAL ADJUSTMENT DEVICE

CROSS-REFERENCE TO RELATED APPLICATION

This application claims the benefit of German Patent Application No. 10 2019 123 960.5 filed Sep. 6, 2019, the entire contents of which are incorporated herein by reference in its entirety.

FIELD

The invention relates to a vehicle seat with a lower part for arrangement on a body part of a commercial vehicle and an upper part for storing a seat part, wherein the vehicle seat has a longitudinal adjustment device, by means of which the upper part is displaceable relative to the lower part in the longitudinal direction and/or width direction of the vehicle seat, and a rotational adjustment device working independently of the longitudinal adjustment device, by means of which rotational adjustment device at least parts of the upper part are rotatable relative to the lower part about an axis in the height direction of the vehicle seat.

BACKGROUND

Generic vehicle seats with longitudinal adjustment devices and rotational adjustment devices are already known from the prior art.

For example, locking devices of the longitudinal adjustment devices and/or rotational adjustment devices are first released manually, whereupon a longitudinal adjustment and/or a rotation of the upper part can take place by a movement initiated by the occupant of the vehicle seat. However, such devices are often arranged one above the other in the height direction of the vehicle seat; thus, the space requirement for the simultaneous arrangement of longitudinal adjustment devices and rotational adjustment devices is often high, at least in the height direction of the vehicle seat.

In addition, the driver sometimes finds it troublesome to adjust the seat using their own strength. In addition, precise manual adjustment is only possible with difficulty.

Electric drives are also known as part of longitudinal adjustment devices and rotational adjustment devices. However, these often also have a large space requirement and are often arranged in a space-consuming manner within the vehicle seat.

SUMMARY

It is therefore an object of the present invention to develop a vehicle seat with a longitudinal adjustment device and a rotational adjustment device, which has a compact design and high accuracy with regard to the adjustment required.

The object of the invention is solved by a vehicle seat with a lower part for arrangement on a body part of a commercial vehicle and an upper part for storing a seat part, in which case the vehicle seat has a longitudinal adjustment device, by means of which the upper part is displaceable relative to the lower part in the longitudinal direction and/or width direction of the vehicle seat, and a rotational adjustment device working independently of the longitudinal adjustment device, by means of which rotational adjustment device at least parts of the upper part are rotatable relative to the lower part about an axis in the height direction of the vehicle seat. According to the invention, a virtual plane is provided, which is arranged intersectingly parallel to a longitudinal direction and a width direction of the vehicle seat as well as the longitudinal adjustment device and the rotational adjustment device, in which case the longitudinal adjustment device and the rotational adjustment device are designed to be electrically driven.

The longitudinal adjustment device and the rotational adjustment device are thus arranged at least partially overlapping in the height direction of the vehicle seat. This greatly reduces the installation space required. In addition, both devices are electrically driven, which eliminates the effort for the seat occupant and increases the accuracy of the desired adjustment.

The longitudinal adjustment device and/or the rotational adjustment device are preferably designed to be self-retaining. This can be easily achieved using the electric drive.

The vehicle seat preferably comprises a vertical suspension device, by means of which the seat part is resiliently mounted. The longitudinal adjustment device and the rotational adjustment device are preferably arranged below the vertical suspension device or above the vertical suspension device. For example, the longitudinal adjustment device and the rotational adjustment device are arranged between the vertical suspension device and the seat part.

The longitudinal adjustment device and/or the rotational adjustment device can be activated manually, for example by the driver actuating a release element (control button) on an operating device. In addition, it is possible for the longitudinal adjustment device and/or the rotational adjustment device to be activated automatically. To this end, it is conceivable that a control system of the vehicle is able to carry out driver recognition and subsequently undertake the preferred settings with regard to longitudinal adjustment and/or rotational adjustment of the recognized driver ("memory function"). For example, when the vehicle is activated, the detection takes place via the detection of the key which can be assigned to a specific driver. Alternatively, it is possible for the driver to identify themselves to the vehicle; for example, as "driver 1" they can press a specific key or select their name ("driver 1") from a menu.

The longitudinal adjustment device and the rotational adjustment device work mechanically and electrically independently of one another. Nevertheless, they can preferably be activated and/or deactivated at the same time, i.e. simultaneously.

In order to further reduce the space requirement, it is preferred if a first height extension of the longitudinal adjustment device has a first upper boundary and a first lower boundary in the height direction of the vehicle seat, in which case a second height extension of the rotational adjustment device or of parts of the rotational adjustment device has a second upper boundary and a second lower boundary in the height direction of the vehicle seat, whereby, viewed in each case in the height direction of the vehicle seat, the first upper boundary is arranged level with or above the second upper boundary and/or the first lower boundary is arranged level with or below the second lower boundary.

The rotational adjustment device is therefore preferably arranged partially or completely between the two boundaries of the longitudinal adjustment device in the height direction.

The first upper boundary and/or the first lower boundary is preferably formed by means of a first electric motor, which is described in more detail below.

It is further preferred if a first longitudinal extension of the longitudinal adjustment device has a first front boundary and a first rear boundary in the longitudinal direction of the vehicle seat, in which case a second longitudinal extension of the rotational adjustment device or of parts of the rotational adjustment device has a second front boundary and a second rear boundary in the longitudinal direction of the vehicle seat, whereby, viewed in each case in the longitudinal direction of the vehicle seat, the first front boundary is arranged level with or in front of the second front boundary and/or the first rear boundary is arranged level with or behind the second rear boundary.

The rotational adjustment device is therefore preferably arranged partially or completely between the two boundaries of the longitudinal adjustment device in the longitudinal direction.

It is moreover preferred if a first width extension of the longitudinal adjustment device has a first left boundary and a first right boundary in the width direction of the vehicle seat, in which case a second width extension of the rotational adjustment device, or of parts of the rotational adjustment device, has a second left boundary and a second right boundary in the width direction of the vehicle seat, whereby, viewed in each case in the width direction of the vehicle seat, the first left boundary is arranged level with or to the left of the second left boundary, and/or the first right boundary is arranged level with or to the right of the second right boundary.

The rotational adjustment device is therefore preferably partially or completely arranged between the two boundaries of the longitudinal adjustment device in the width direction.

As will be explained below, the longitudinal adjustment device has, for example, rails (usually two pairs of rails, each comprising a guide rail and a slide rail in engagement therewith) for guiding the longitudinal adjustment, said rails often being purchased parts which, in terms of the mechanical design thereof, are already well adapted to the forces and moments occurring when a vehicle seat is used. However, this also means that the construction of the rails, and thus the boundaries of the installation space required for the longitudinal adjustment device, cannot be changed significantly, at least with respect to the rails. According to the above preferred features, the rotational adjustment device is therefore advantageously fitted into the remaining space in such a way that no installation space boundaries of the longitudinal adjustment device that are already present and necessary are exceeded.

The compact construction can further be advantageously supported if the longitudinal adjustment device has a first electric motor for displacing the upper part relative to the lower part in the longitudinal direction and/or width direction of the vehicle seat, and the rotational adjustment device has a second electric motor for rotating the upper part relative to the lower part about the axis in the height direction of the vehicle seat, and if a first drive axle of the first electric motor and a second drive axle of the second electric motor are arranged parallel to one another, and/or parallel to the longitudinal direction or to the width direction of the vehicle seat.

This increases the probability that the installation space for both electric motors does not overlap. The first drive axle of the first electric motor is advantageously arranged perpendicular to the longitudinal extension of the slide and guide rails. Mechanical connection of the first electric motor to the slide rails is thus simplified.

It is further preferred that the first electric motor be connected to a rear end of the upper part, and the second electric motor be connected to a front end of the upper part. The relatively installation-space-intensive electric drives are therefore preferably arranged spatially separated from one another and/or arranged as far apart from one another as possible. This also makes it possible to ensure that the heat generated by the motors can be dissipated more quickly and that one electric motor not be additionally heated by the other electric motor.

It is moreover preferred if the longitudinal adjustment device comprises two rail units arranged in the longitudinal direction and/or width direction, each with a guide rail and a slide rail, in which case the guide rails are each connected to the lower part, and the slide rails are each connected to the upper part. In this case, by means of the first electric motor, which is arranged between the two rail units and is interactively connected to each of the slide rails via a respective gear unit, the slide rail is preferably displaceable in each case relative to the guide rail.

In this case, it is provided, for example, that each of the gear units comprises the following: a shaft aligned with the first drive axle of the first electric motor and operatively connected thereto, and a worm gear unit which is operatively connected on a first side to the shaft and, on a second side, to a spindle element arranged within one of the slide rails, wherein the spindle element is operatively connected to a driver element rigidly connected to one of the guide rails.

The shaft is preferably designed in each case to be flexible such that, by means of its flexibility, it can compensate for positional tolerances (positional deviations) between the drive axle of the electric motor and an axis of a first worm wheel, which is arranged on the first side of the worm gear unit.

The first electric motor, the shaft, the worm gear unit, and the slide rail thus move along when there is a longitudinal adjustment of the upper part relative to the lower part. The guide rail and the driver element, on the other hand, advantageously do not move along when there is a longitudinal adjustment of the upper part relative to the lower part.

In general, it is advantageous if the rotational adjustment device be designed without a connection to the lower part and/or contactlessly to the lower part, in order not to hinder the desired relative rotation.

An advantageous configuration of the rotational adjustment device provides for the latter to have a primary gear unit, which is mechanically operatively connected on the drive side to the second electric motor and, on the output side, to a secondary gear unit, in which case the secondary gear unit is arranged mechanically operatively connected to a rotary plate unit of the rotational adjustment device which is rotatably mounted with respect to the lower part and rigidly connected to the upper part.

In this case, the primary gear unit comprises, for example, a worm gear unit, which preferably comprises a first and a second worm wheel. In this case, the first worm wheel is preferably rigidly connected to the second drive axle of the second electric motor. The second worm wheel is in engagement with the first worm wheel. The central axis of the second worm wheel is preferably arranged perpendicular to the central axis of the first worm wheel and/or parallel to the height direction of the vehicle seat.

In this case, the secondary gear unit advantageously comprises a self-contained ribbon-shaped force transmission means which interacts with a circumference of the rotary plate unit and which can be conveyed in the direction of its circumference by means of the second electric motor.

The ribbon-shaped force transmission means is preferably in engagement with the second worm wheel, such that a rotation of the drive axle of the second electric motor is transmitted via the first worm wheel and the second worm wheel into a rotation of the ribbon-shaped force transmission means. For example, for this purpose the second worm wheel is provided with two adjacent functional areas along its central axis, wherein the first functional area has helical teeth and is in engagement with the first worm wheel, and wherein the second functional area is designed to interact with the ribbon-shaped force transmission means. Examples of the second functional area are described in more detail below.

In the context of the present invention, the term "ribbon-shaped" is understood to be an element, the cross-sectional dimensions of which are small compared to its length. The ribbon-shaped element is preferably designed to be closed in terms of its length.

For example, the rotary plate unit is designed as a chain wheel, and the ribbon-shaped force transmission means is designed as a chain element. According to this variant, a positive interaction between the rotary plate unit and the ribbon-shaped force transmission means is thus formed. Thus, the second functional area of the second worm wheel is also preferably configured in this case as a chain wheel.

A further variant, according to which a non-positive interaction between the rotary plate unit and the ribbon-shaped force transmission means is designed, provides for the rotary plate unit to be designed as a pulley element and the ribbon-shaped force transmission means to be designed as a belt element. For example, the ribbon-shaped force transmission means is designed as a V-belt or as a poly-V belt, and the rotary plate unit as a pulley is designed accordingly to be complementary thereto. Thus, the second functional area of the second worm wheel is also preferably designed in this case as a pulley that is designed accordingly to be complementary to the ribbon-shaped force transmission means.

Preferably, the rotational adjustment device further comprises a crown roller bearing unit, which is arranged above the rotary plate unit in the height direction of the vehicle seat. Said crown roller bearing unit preferably comprises an upper cage plate and a lower cage plate, between which roller bearing bodies, for example balls, are arranged.

The upper cage plate is, for example, part of a first cover plate which closes off the rotational adjustment device upwardly in the height direction. The first cover plate is preferably rigidly connected to the rotary plate unit, such that rotation of the rotary plate unit is transferred into rotation of the first cover plate; this is preferably done at a transmission ratio of 1:1.

The lower cage plate is, for example, part of a second cover plate, which is arranged below the first cover plate in the height direction. The second cover plate is preferably designed free of mechanical connection to the rotary plate unit, such that rotation of the rotary plate unit is not transferred into rotation of the second cover plate.

In this respect, preferably only parts of the upper part are mounted so as to rotate relative to the lower part by means of the rotational adjustment device. The following are preferably mounted so as to rotate by means of the rotational adjustment device: the upper cover plate, the rotary plate unit, and parts which are arranged, for example, above the upper cover plate in the height direction and which, for example, form the actual seat part with a seat surface and/or backrest. The following are preferably mounted so as not to rotate by means of the rotational adjustment device: the longitudinal adjustment device, the lower cover plate, the primary gear unit, the second electric motor, and/or the secondary gear unit.

The parts of the rotational adjustment device which meet the above conditions with regard to the upper, lower, left, right, front, and/or rear boundaries are to be understood in particular to mean the following parts individually or in any combination: the primary gear unit, the second electric motor, the secondary gear unit, and/or the rotary plate unit.

The rotational adjustment device preferably comprises a tensioning unit, by means of which pre-tensioning of the ribbon-shaped force transmission means can be adjusted.

For example, the tensioning unit comprises an element which is in engagement with the ribbon-shaped force transmission means and the position of which along a guide track can be adjusted. The element is preferably designed as a disc or as a chain wheel. The guide track is preferably formed in a plane which is arranged perpendicular to the height direction of the vehicle seat and/or to the central axis of the second worm wheel. For example, the guide track is provided in the form of a recess in a housing plate. A bearing seat for the second drive motor is preferably also formed by means of this housing plate.

It should be noted that, in the context of the present invention, the positional information (for example, front, rear, top, bottom, left, right, etc.) and directional information (height direction, longitudinal direction, width direction) are always defined in relation to the vehicle seat. Global influences, such as a downward slope of a vehicle comprising the vehicle seat and a resulting deflection of the vehicle seat are, on the contrary, not relevant.

BRIEF DESCRIPTION OF THE DRAWINGS

Further advantages, objects, and characteristics of the present invention are explained based on the attached drawings and the following description, in which a vehicle seat is represented and described by way of example with differently formed guide devices.

The drawings show:

FIG. 2d a further perspective view of parts of the vehicle seat according to the invention as per FIG. 1a;

DETAILED DESCRIPTION

It should be mentioned that, for the sake of clarity, some components are not depicted in some of the figures. Thus, FIGS. 1a, 1b, 1c, 1d, 1e, 1f, 1g, 2a, 2b, 2c, 2d, 2e, 3a, 3b, 3c, 3d, and 3e only show parts of a vehicle seat 1 according to the invention.

Moreover, the drawings are each provided with a Cartesian coordinate system, which has the three axes 1x (longitudinal direction of the vehicle seat 1 from front to rear, corresponding to the direction of the arrow), 1y (width direction of the vehicle seat 1 from left to right, corresponding to the direction of the arrow), and 1z (height direction of the vehicle seat 1 from bottom to top corresponding to the direction of the arrow).

Figure 4:
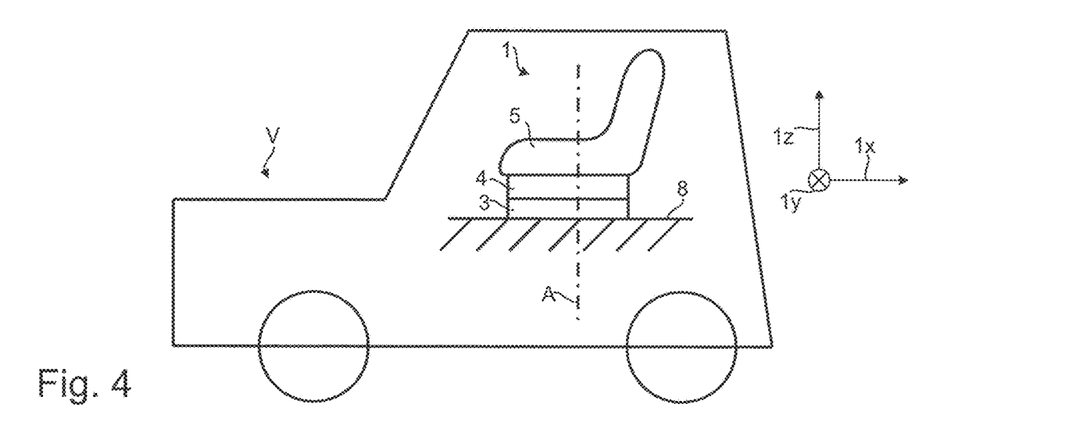
FIG. 4 a greatly simplified depiction of a vehicle seat according to the invention.

FIG. 4 schematically shows a vehicle seat 1 with a lower part 3 for arrangement on a body part 8 of a commercial vehicle V and an upper part 4 for storing a seat part 5. The vehicle seat 1 comprises a longitudinal adjustment device, not shown in FIG. 4 (see longitudinal adjustment device 10 in the remaining figures), by means of which the upper part 4 is displaceable relative to the lower part 3 in the longitudinal direction 1x and/or width direction 1y of the vehicle seat 1, and a rotational adjustment device working independently of the longitudinal adjustment device and not shown in FIG. 4 (see rotational adjustment device 20 in the remaining figures), by means of which rotational adjustment device at least parts of the upper part 4 are rotatable relative to the lower part 3 about an axis A in the height direction 1z of the vehicle seat 1.

Furthermore, a virtual plane E is provided (refer to FIG. 1g), which is arranged intersectingly parallel to a longitudinal direction 1x and a width direction 1y of the vehicle seat 1 as well as the longitudinal adjustment device 10 and the rotational adjustment device 20, in which case the longitudinal adjustment device 10 and the rotational adjustment device 20 are designed to be electrically driven.

The longitudinal adjustment device 10 and the rotational adjustment device 20 are thus arranged at least partially overlapping in the height direction 1x of the vehicle seat 1.

FIG. 1 further shows that a first height extension 10z of the longitudinal adjustment device 10 has a first upper boundary 10z1 and a first lower boundary 10z2 in the height direction 1z of the vehicle seat 1, and that a second height extension 20z of parts of the rotational adjustment device 20 has a second upper boundary 20z1 and a second lower boundary 20z2 in the height direction 1z of the vehicle seat 1, whereby, viewed in each case in the height direction 1z of the vehicle seat 1, the first upper boundary 10z1 is arranged above the second upper boundary 20z1, and the first lower boundary 10z2 is arranged below the second lower boundary 20z2.

In the present case, the rotational adjustment device 20 is therefore partially arranged between the two boundaries 10z1, 10z2 of the longitudinal adjustment device 10 in the height direction 1z.

In the present case, the first upper boundary 10z1 and the first lower boundary 10z2 are formed by means of a first electric motor 16. In the present case, the second upper boundary 20z1 and the second lower boundary 20z2 are formed by means of a second electric motor 26. Further elements of the rotational adjustment device 20, which are optionally arranged above the first upper boundary 10z1, are not shown.

Figure 3A:
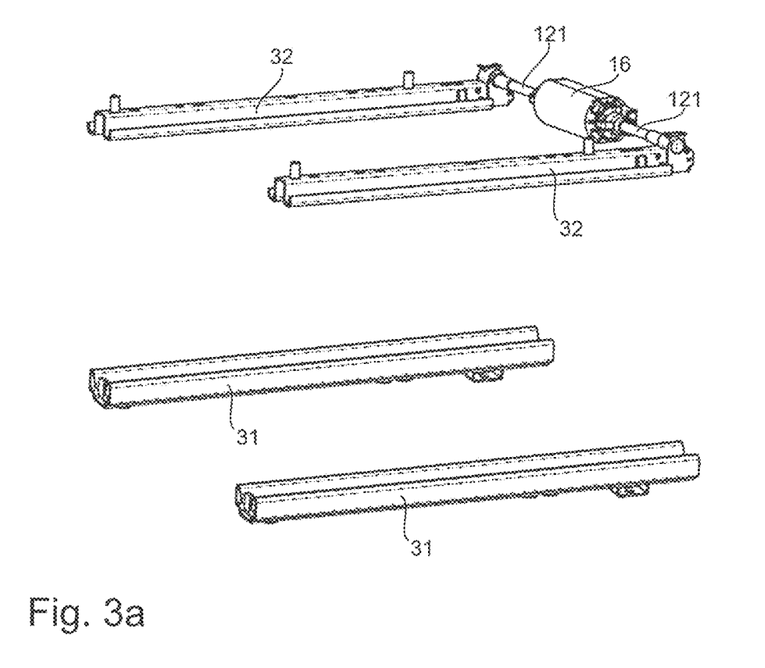
FIG. 3a an exploded perspective view of the longitudinal adjustment device.
Figure 3B:
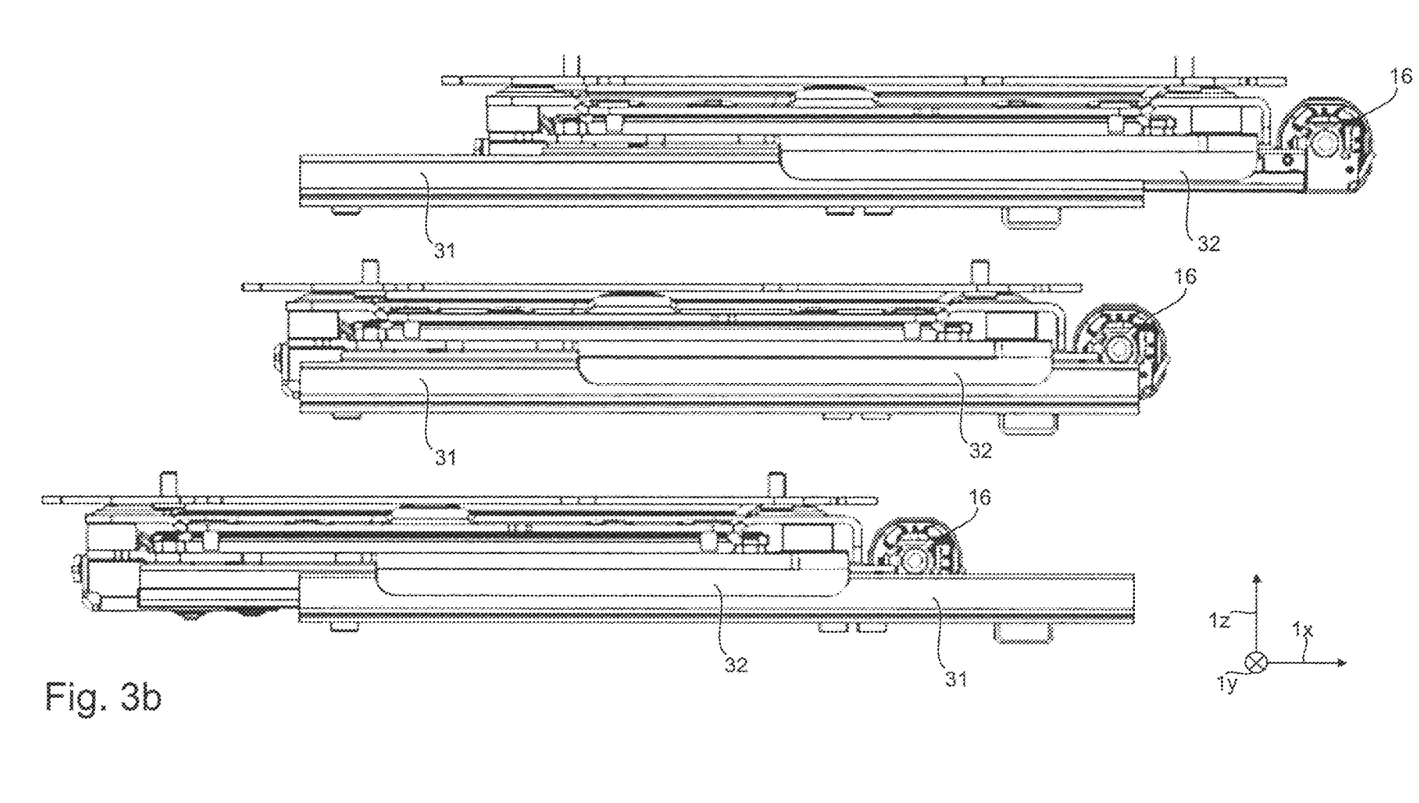
FIG. 3b a side view of parts of the vehicle seat according to the invention as per FIG. 1a in different translational states of the longitudinal adjustment device.
Figure 3C:
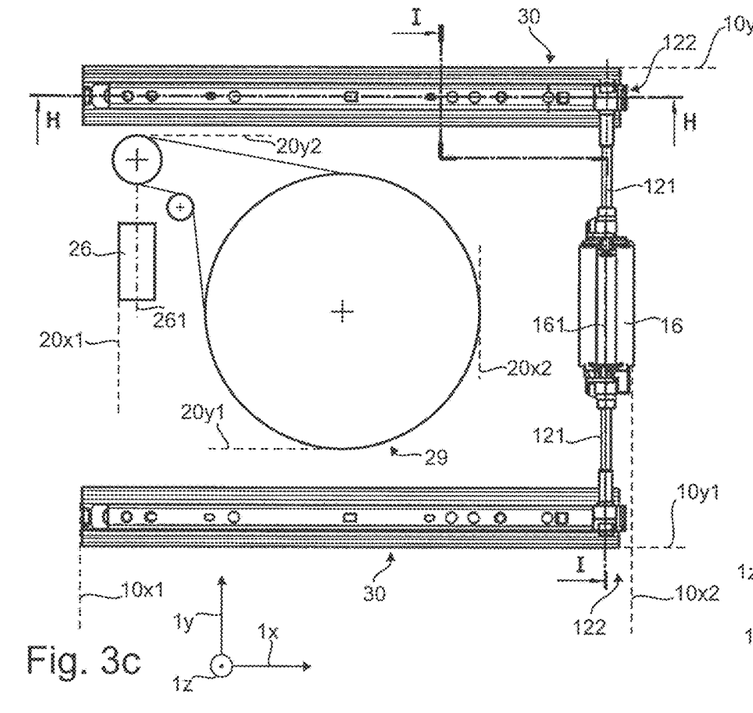
FIG. 3c a plan view of the longitudinal adjustment device.

FIG. 3c further shows that a first longitudinal extension 10x of the longitudinal adjustment device 10 has a first front boundary 10x1 and a first rear boundary 10x2 in the longitudinal direction 1x of the vehicle seat 1, in which case a second longitudinal extension 20x of parts of the rotational adjustment device 20 has a second front boundary 20x1 and a second rear boundary 20x2 in the longitudinal direction 1x of the vehicle seat 1, whereby, viewed in each case in the longitudinal direction 1x of the vehicle seat 1, the first front boundary 10x1 is arranged in front of the second front boundary 20x1, and the first rear boundary 10x2 is arranged behind the second rear boundary 20x2.

In the present case, the rotational adjustment device 20 is therefore partially arranged between the two boundaries 10x1, 10x2 of the longitudinal adjustment device 10 in the longitudinal direction 1x.

In the present case, the first front boundary 10x1 is formed by means of the two rail units 30, and the first rear boundary 10x2 is formed by means of the first electric motor 16. In the present case, the second front boundary 20x1 is formed by means of the second electric motor 26, and the second rear boundary 20x2 is formed by means of a ribbon-shaped force transmission means 281. Further elements of the rotational adjustment device 20, which are optionally arranged outside a region between the first front boundary 10x1 and the first rear boundary 10x2, are not shown.

FIG. 3c furthermore shows that a first width extension 10y of the longitudinal adjustment device 10 has a first left boundary 10y1 and a first right boundary 10y2 in the width direction 1y of the vehicle seat 1, in which case a second width extension 20y of the rotational adjustment device 20 has a second left boundary 20y1 and a second right boundary 20y2 in the width direction 1y of the vehicle seat 1, whereby, viewed in each case in the width direction 1y of the vehicle seat 1, the first left boundary 10y1 is arranged to the left of the second left boundary 20y1, and the first right boundary 10y2 is arranged to the right of the second right boundary 20y2.

In the present case, the rotational adjustment device 20 is therefore completely arranged between the two boundaries 10y1, 10y2 of the longitudinal adjustment device 10 in the width direction 1y.

In the present case, the first left boundary 10y1 is formed by means of the left rails 30 and the first right boundary 10y2 is formed by means of the right rails 30. In the present case, the second left boundary 20y1 is formed by means of the ribbon-shaped force transmission means 281, and the second right boundary 20y2 is formed by means of a primary gear unit 27.

In the present case, the longitudinal adjustment device 10 comprises a first electric motor 16 for displacing the upper part 4 relative to the lower part 3 in the longitudinal direction 1x of the vehicle seat 1, and the rotational adjustment device 20 comprises a second electric motor 26 for rotating the upper part 4 relative to the lower part 3 about the axis A in the height direction 1z of the vehicle seat 1, wherein a first drive axle 161 of the first electric motor 16 and a second drive axle 261 of the second electric motor 26 are arranged parallel to one another and/or parallel to the width direction 1y of the vehicle seat 1 (see FIG. 3c).

The installation space for both electric motors 16, 26, and both the electric motors 16, 26 themselves, are thus arranged spaced apart from one another in the present case. In the present case, the first drive axle 161 of the first electric motor 16 is arranged perpendicular to the longitudinal extension of the slide rails 32 and the guide rails 31. Mechanical connection of the first electric motor 16 to the slide rails 32 is thus simplified.

FIG. 3c also shows that the first electric motor 16 is connected to a rear end 42 of the upper part 4, and the second electric motor 26 is connected to a front end 41 of the upper part 4. The relatively installation-space-intensive electric motors 16, 26 are therefore arranged spatially separated from one another and, furthermore, as far apart from one another as possible.

Figure 3D:
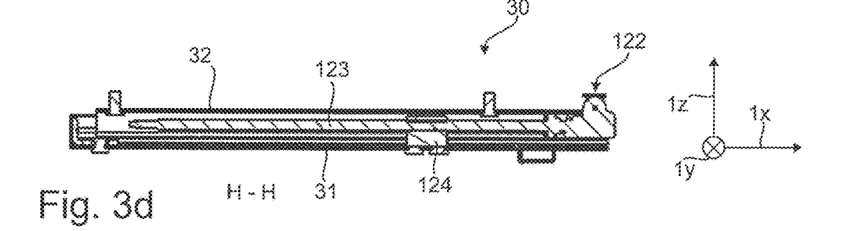
FIGS. 3d, 3e cross-sectional views of FIG. 3c.

FIG. 3d in particular also shows that the longitudinal adjustment device 10 comprises two rail units 30 arranged in the longitudinal direction 1x and/or width direction 1y, each with a guide rail 31 and a slide rail 32, in which case the guide rails 31 are each connected to the lower part 3, and the slide rails 32 are each connected to the upper part 4. FIG. 3c also shows that, in the present case, by means of the first electric motor 16, which is arranged between the two rail units 30 and is interactively connected to each of the slide rails 32 via a respective gear unit 12, the slide rail 32 is displaceable in each case relative to the guide rail 31.

FIG. 3b shows, respectively, different states with respect to a longitudinal adjustment of the slide rail 32 relative to the guide rail 31 in the longitudinal direction 1x: from top to bottom, a rear maximum state, a central state, and a front maximum state.

Figure 3E:
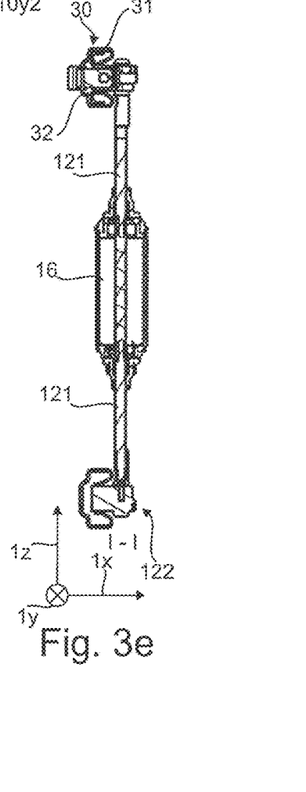

In this case, FIGS. 3c, 3d, and 3e show that each of the gear units 12 comprises the following in the present case: a shaft 121 aligned with the first drive axle 161 of the first electric motor 16 and operatively connected thereto, and a worm gear unit 122 which is operatively connected on a first side to the shaft 121 and, on a second side, to a spindle element 123 arranged within one of the slide rails 32, in which case the spindle element 123 is operatively connected to a driver element 124 rigidly connected to one of the guide rails 31.

In general, it is provided in the present case that the rotational adjustment device 20 is designed free of a connection to the lower part 3 and without contact to the lower part 3.

Figure 1A:
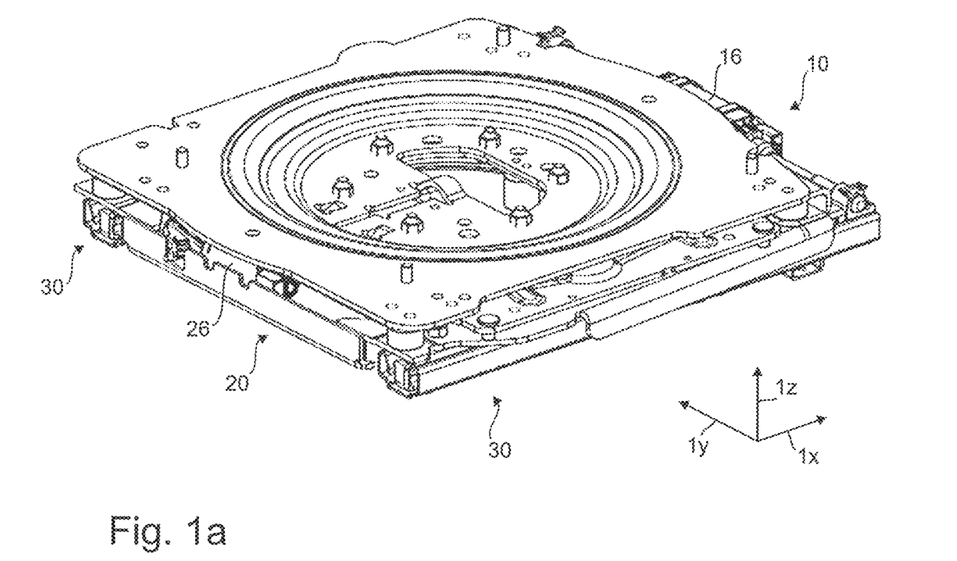
FIG. 1a a perspective view of parts of a vehicle seat according to the invention with a longitudinal adjustment device and a rotational adjustment device.
Figure 1B:
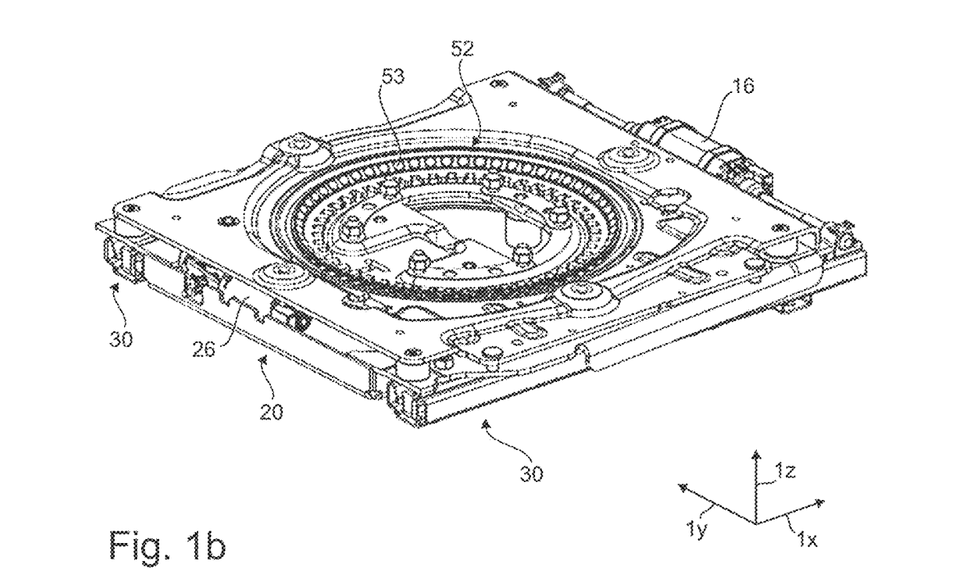
FIG. 1b the view of FIG. 1a without upper cover elements.
Figure 1C:
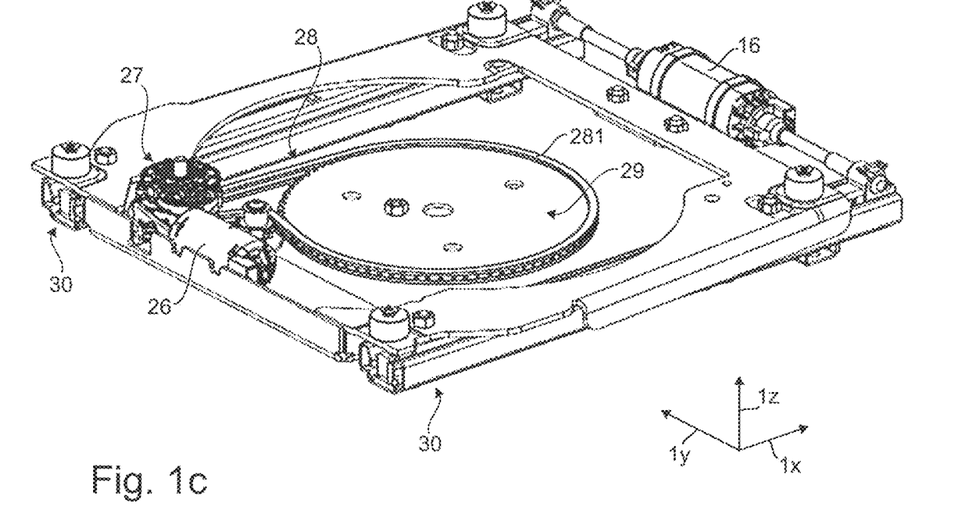
FIG. 1c the view of FIG. 1a with additional hidden elements.
Figure 1D:
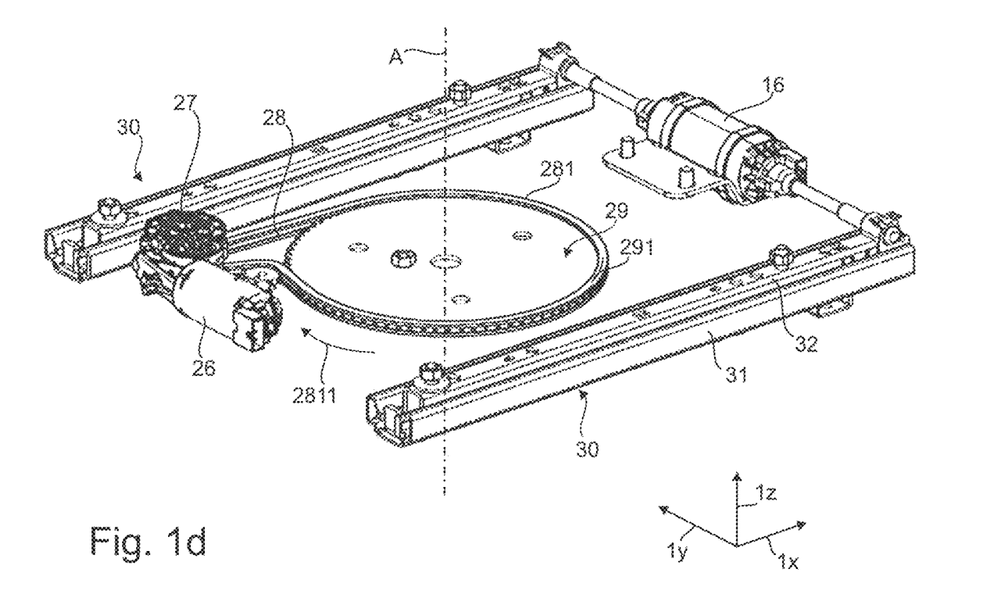
FIG. 1d the view of FIG. 1a with additional hidden elements.

In the present case, FIG. 1d shows, in particular, that the rotational adjustment device 20 has a primary gear unit 27, which is operatively connected on the drive side to the second electric motor 26 and on the output side to a secondary gear unit 28 of the rotational adjustment device 20, in which case the secondary gear unit 28 is arranged operatively connected to a rotary plate unit 29 of the rotational adjustment device 20 which is rotatably mounted with respect to the lower part 3 and rigidly connected to the upper part 4.

Details of the primary gear unit 27 are not shown. In the present case, the primary gear unit 27 comprises a worm gear unit, which comprises a first and a second worm wheel. In this case, the first worm wheel is rigidly connected to the second drive axle 261 of the second electric motor 26. The second worm wheel is in engagement with the first worm wheel, wherein the central axis of the second worm wheel is arranged perpendicular to the central axis of the first worm wheel and parallel to the height direction 1z of the vehicle seat 1.

In the present case, the secondary gear unit 28 comprises a self-contained ribbon-shaped force transmission means 281 which interacts with a circumference 291 of the rotary plate unit 29 and which can be conveyed in the direction of its circumference 2811 by means of the second electric motor 26.

In the present case, the ribbon-shaped force transmission means 281 is in engagement with the second worm wheel, not shown, such that a rotation of the drive axle 261 of the second electric motor 26 is transmitted via the first worm wheel and the second worm wheel into a rotation of the ribbon-shaped force transmission means 281 and into a rotation of the rotary plate unit 29. In the present case, for this purpose, the second worm wheel is provided with two adjacent functional areas along its central axis, wherein the first functional area has helical teeth and is in engagement with the first worm wheel, and wherein the second functional area is designed to interact with the ribbon-shaped force transmission means 281.

In the present case, the ribbon-shaped force transmission means 281 is an element, the cross-sectional dimensions of which are small compared to its length. In the present case, it is designed to be closed in terms of its length.

In the present case, the rotary plate unit 29 is designed as a chain wheel, and the ribbon-shaped force transmission means 281 is designed as a chain element or a chain. According to this variant, a positive-locking interaction between the rotary plate unit 29 and the ribbon-shaped force transmission means 281 is thus formed. Thus, in the present case, the second functional area of the second worm wheel is also designed in this case as a chain wheel.

In the present case, the rotational adjustment device 20 further comprises a crown roller bearing unit 50 (refer in particular FIG. 1f), which is arranged above the rotary plate unit 29 in the height direction 1z of the vehicle seat 1. Said crown roller bearing unit preferably comprises an upper cage plate 51 and a lower cage plate 52, between which roller bearing bodies 53, for example balls, are arranged.

Figure 1E:
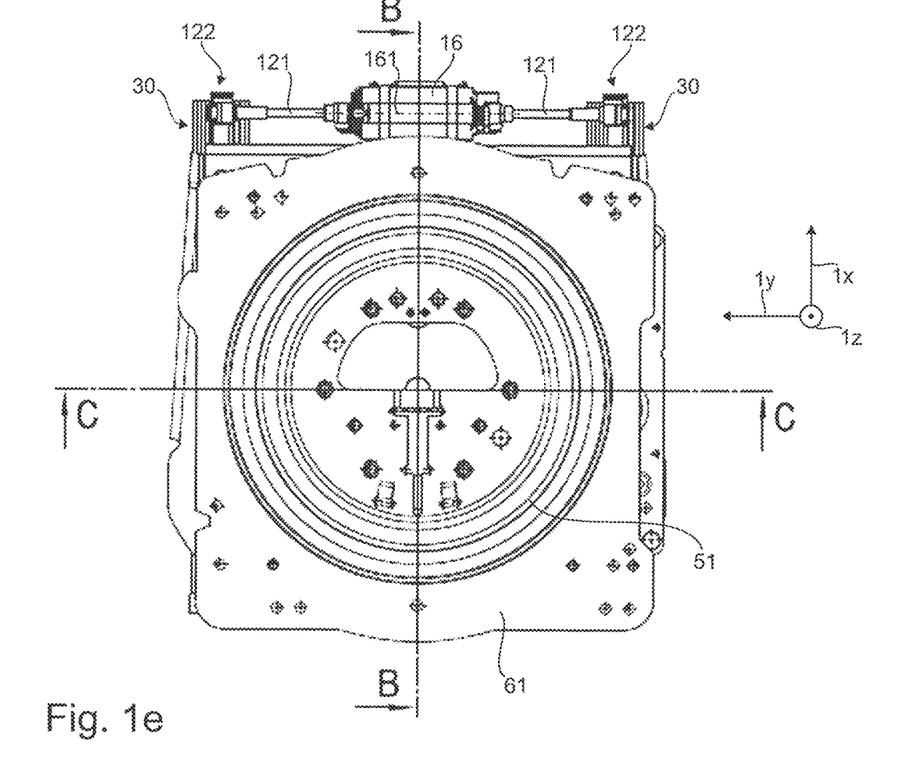
FIG. 1e a plan view of parts of the vehicle seat according to the invention according to FIG. 1.
Figure 2A:
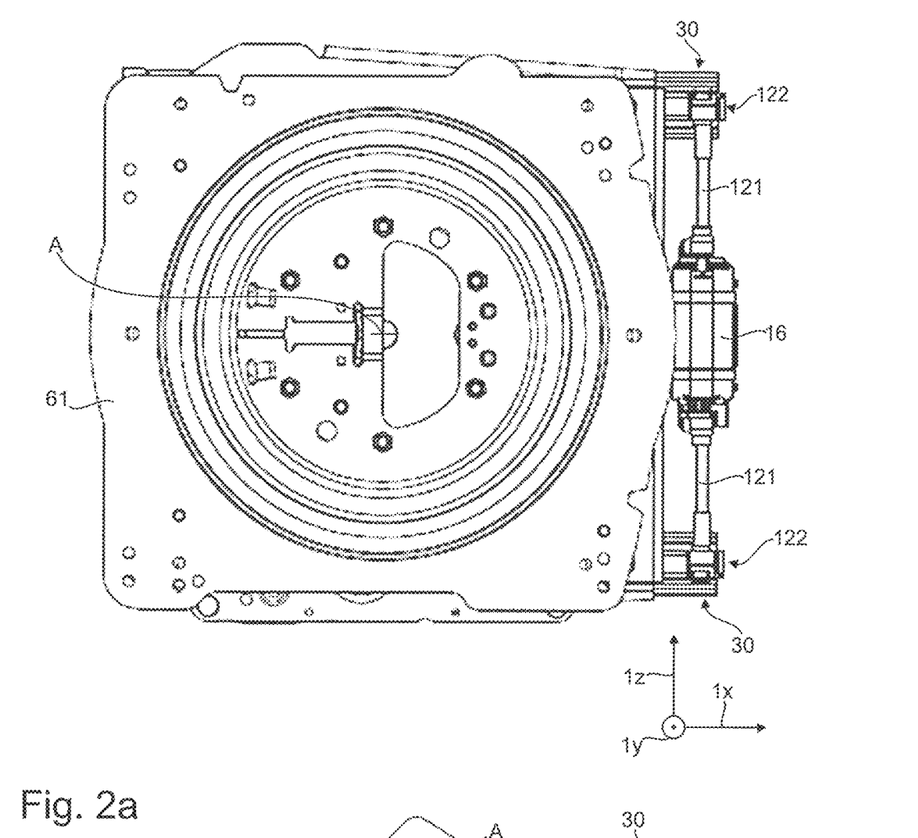
FIGS. 2a, 2b, 2c the view of FIG. 1e in different rotational states of the rotational adjustment device.
Figure 2B:
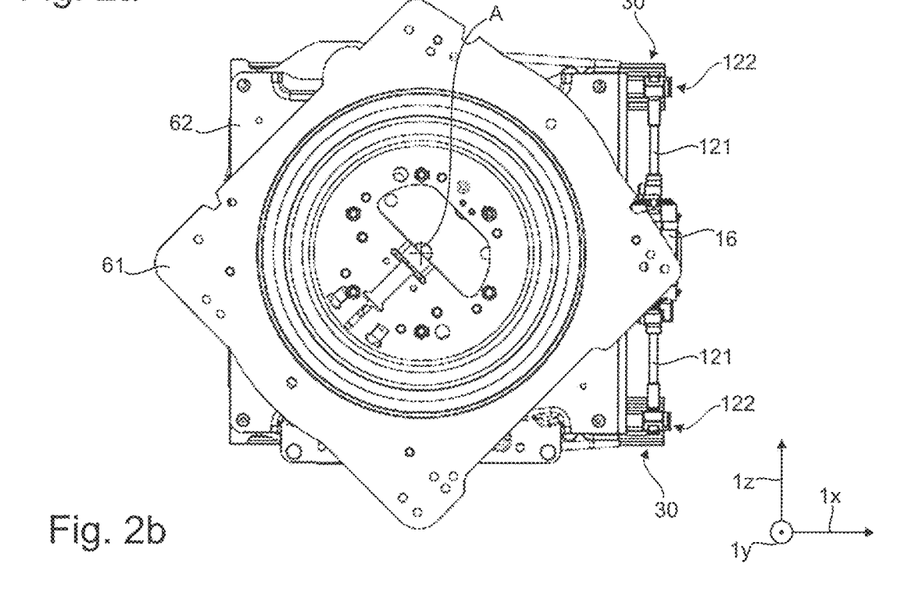
Figure 2C:
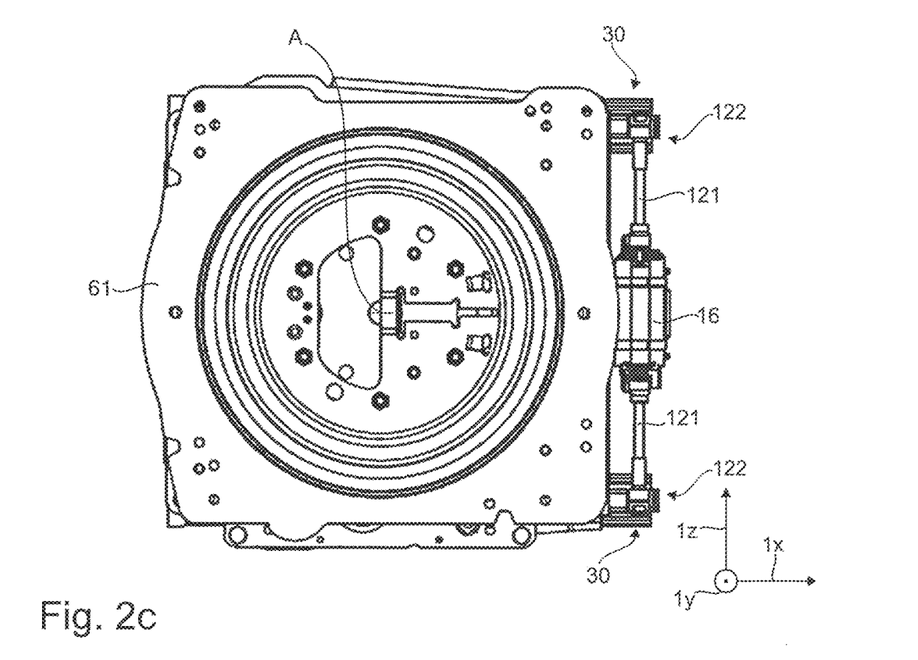

In the present case, the upper cage plate 51 is part of a first cover plate 61 which closes off the rotational adjustment device 20 upwardly in the height direction 1z (refer to FIG. 1e). In the present case, the first cover plate 61 is rigidly connected to the rotary plate unit 29 such that a rotation of the rotary plate unit 29 is transferred into a rotation of the first cover plate 61 at the transmission ratio of 1:1. FIGS. 2a, 2b, and 2c here show different states of rotation of the first cover plate 61.

Figure 1F:
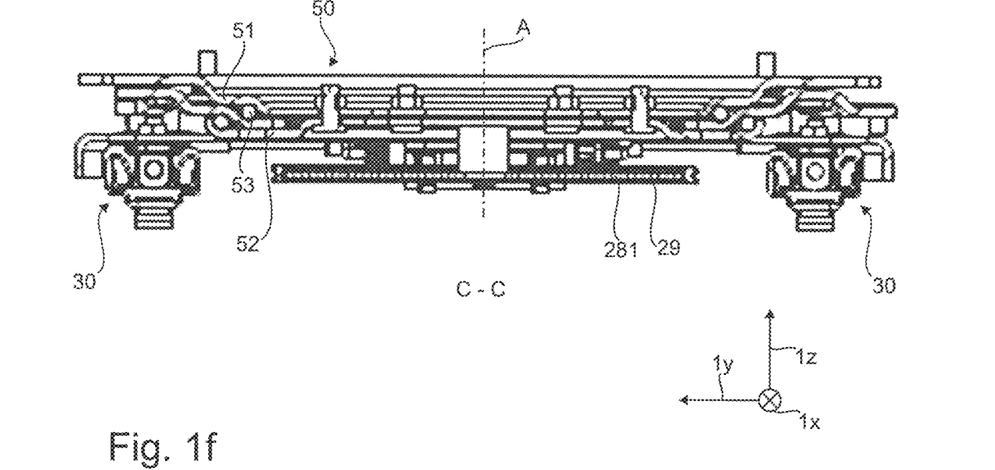
FIGS. 1f, 1g cross-sectional views of FIG. 1e.
Figure 1G:
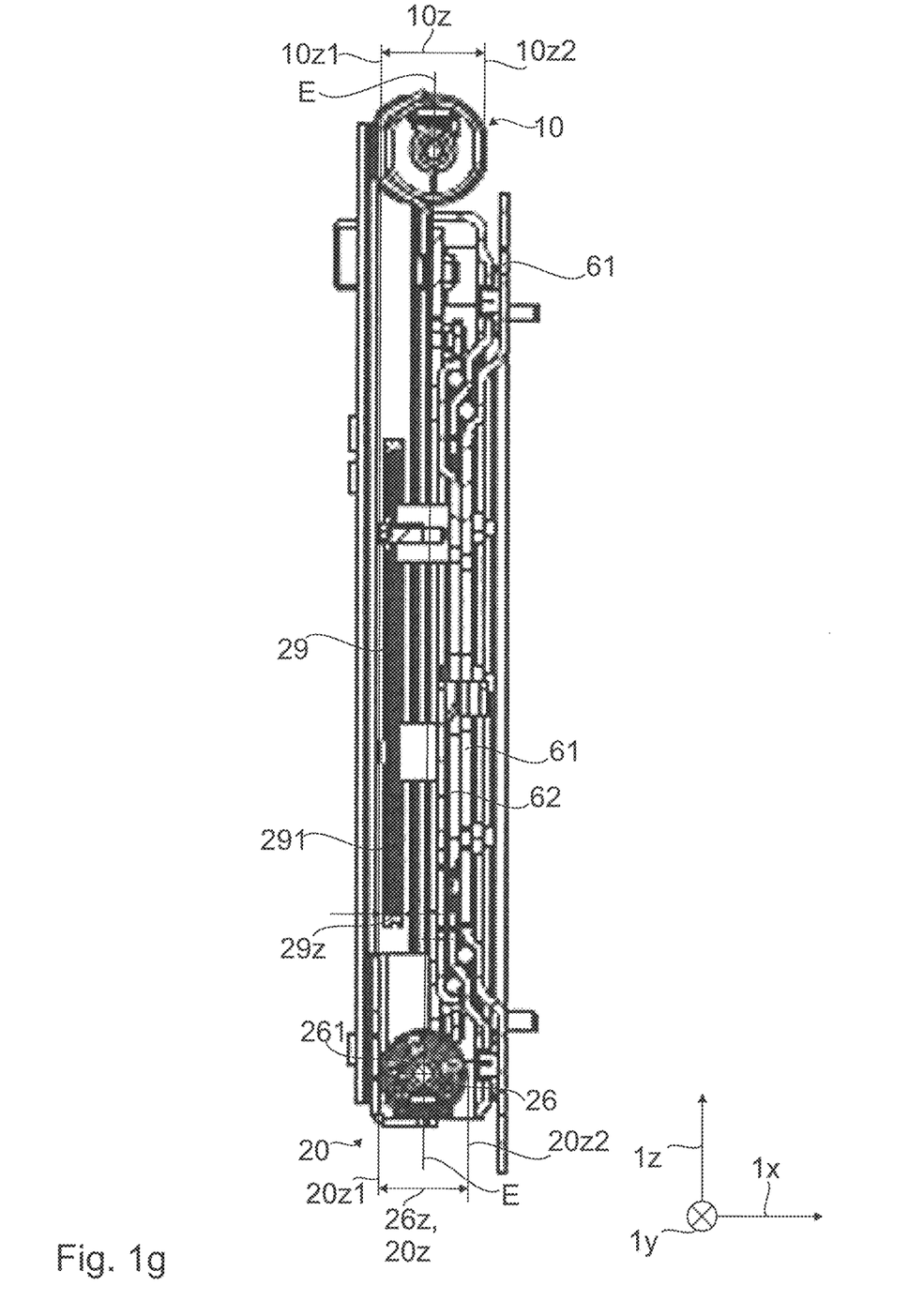

In the present case, the lower cage plate 52 is part of a second cover plate 62, which is arranged below the first cover plate 61 in the height direction 1z. In the present case, the second cover plate 62 is designed, apart from the roller bearing by means of the balls 53, free of mechanical connection to the rotary plate unit 29, such that a rotation of the rotary plate unit 29 is not transferred into a rotation of the second cover plate 62.

In the present case, the following are mounted so as to rotate by means of the rotational adjustment device 20: the upper cover plate 61, the rotary plate unit 29, and parts which are not shown and are arranged, for example, above the upper cover plate 61 in the height direction 1z and which, for example, form the actual seat part 5 with seat surface and/or backrest. In the present case, the following are preferably mounted so as not to rotate by means of the rotational adjustment device 20: the longitudinal adjustment device 10, the lower cover plate 62, the primary gear unit 27, and the second electric motor 26.

In the present case, the parts of the rotational adjustment device 20 which meet the above conditions with regard to the upper 10z1, 20z1, lower 10z2, 20z2, left 10y1, 20y1, right 10y2, 20y2, front 10x1, 20x1, and rear 10x2, 20x2 boundaries are to be understood in particular to mean the following parts individually or in any combination: the primary gear unit 27, the second electric motor 26, the secondary gear unit 28, and the rotary plate unit 29.

Figure 2D:
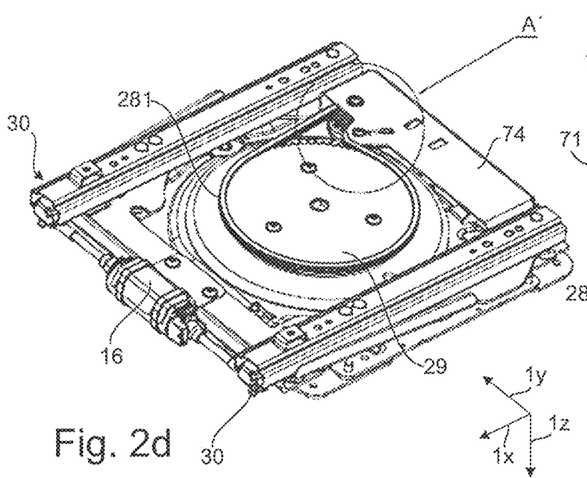
Figure 2E:
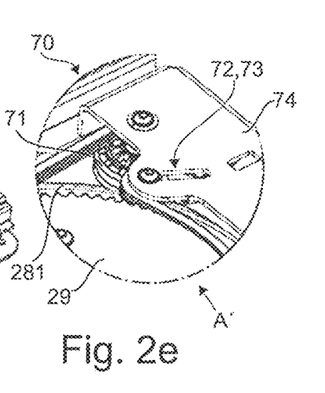
FIG. 2e a detail view of the view according to section A' of FIG. 2d.

In the present case, the rotational adjustment device 20 comprises a tensioning unit 70, by means of which a pre-tensioning of the ribbon-shaped force transmission means 281 can be adjusted (refer in particular to FIGS. 2d and 2e, each of which shows a view of the combined longitudinal adjustment device 10 and rotational adjustment device 20 from below). In the present case, the tensioning unit 70 comprises an element 71 which is in engagement with the ribbon-shaped force transmission means 281 and the position of which can be adjusted along a guide track 72. In the present case, the element 71 is designed as a chain wheel. In the present case, the guide track 72 is formed in a plane which is arranged perpendicular to the central axis of the second worm wheel (not shown), and thus perpendicular to the height direction 1z. In the present case, the guide track 72 is provided in the form of a recess 73 in a housing plate 74. In the present case, a bearing seat for the second electric motor 26 is also formed by means of this housing plate 74.

It is understood that the embodiments explained above are merely a first configuration of the vehicle seat according to the invention. In this respect, the configuration of the invention is not limited to these embodiments.

All features disclosed in the application documents are claimed as being essential to the invention, provided they are, individually or in combination, novel over the prior art.

LIST OF REFERENCE SIGNS

1 Vehicle seat
1x Longitudinal direction
1y Width direction
1z Height direction
3 Lower part
4 Upper part
5 Seat part
8 Body part
10 Longitudinal adjustment device
12 Gear unit
16, 26 Electric motor
20 Rotational adjustment device
27 Primary gear unit
28 Secondary gear unit
29 Rotary plate unit
30 Rail unit
31 Guide rail
32 Slide rail
41, 42 End
50 Crown roller bearing unit
51, 52 Cage plate
61, 62 Cover plate
70 Tensioning unit
121 Shaft
122 Worm gear unit
123 Spindle element
124 Driver element
161, 261 Drive axle
281 Ribbon-shaped force transmission means
291, 2811 Circumference
A Axis
E Plane
V Commercial vehicle

What is claimed is:

1. A vehicle seat comprising: a lower part for arrangement on a body part of a commercial vehicle and an upper part for storing a seat part,
wherein the vehicle seat has a longitudinal adjustment device, by which the upper part is displaceable relative to the lower part in at least one of a longitudinal direction and a width direction of the vehicle seat, and a rotational adjustment device working independently of the longitudinal adjustment device, by which at least parts of the upper part are rotatable relative to the lower part about an axis in a height direction of the vehicle seat,
wherein the longitudinal adjustment device and the rotational adjustment device are designed to be electrically driven,
wherein a first height extension of the longitudinal adjustment device has a first upper boundary and a first lower boundary in the height direction of the vehicle seat,
wherein a second height extension of the rotational adjustment device has a second upper boundary and a second lower boundary in the height direction of the vehicle seat, and
wherein, viewed in the height direction of the vehicle seat, the first upper boundary is arranged level with or above the second upper boundary.

2. The vehicle seat according to claim 1, wherein, viewed in the height direction of the vehicle seat, the first lower boundary is arranged level with or below the second lower boundary.

3. The vehicle seat according to claim 1,
wherein a first longitudinal extension of the longitudinal adjustment device has a first front boundary and a first rear boundary in the longitudinal direction of the vehicle seat,
wherein a second longitudinal extension of the rotational adjustment device has a second front boundary and a second rear boundary in the longitudinal direction of the vehicle seat, and
wherein, viewed in each case in the longitudinal direction of the vehicle seat, the first front boundary is arranged level with or in front of the second front boundary, and/or the first rear boundary is arranged level with or behind the second rear boundary.

4. The vehicle seat according to claim 1,
wherein a first width extension of the longitudinal adjustment device has a first left boundary and a first right boundary in the width direction of the vehicle seat,
wherein a second width extension of the rotational adjustment device has a second left boundary and a second right boundary in the width direction of the vehicle seat, and
wherein, viewed in each case in the width direction of the vehicle seat, the first left boundary is arranged level with or to the left of the second left boundary, and/or the first right boundary is arranged level with or to the right of the second right boundary.

5. The vehicle seat according to claim 1,
wherein the longitudinal adjustment device has a first electric motor for displacing the upper part relative to the lower part in the longitudinal direction and/or width direction of the vehicle seat, and the rotational adjustment device has a second electric motor for rotating the upper part relative to the lower part about the axis in the height direction of the vehicle seat, and
wherein a first drive axle of the first electric motor and a second drive axle of the second electric motor are arranged parallel to one another, and/or parallel to the longitudinal direction, or to the width direction of the vehicle seat.

6. The vehicle seat according to claim 5, wherein the first electric motor is connected to a rear end of the upper part, and the second electric motor is connected to a front end of the upper part.

7. The vehicle seat according to claim 5 or 6,
wherein the longitudinal adjustment device comprises two rail units arranged in the longitudinal direction and/or width direction, each with guide rails and slide rails, wherein the guide rails are each connected to the lower part, and the slide rails are each connected to the upper part, and wherein, by the first electric motor, which is arranged between the two rail units and is interactively connected to each of the slide rails via a respective gear unit, each slide rail is displaceable in each case relative to a respective guide rail.

8. The vehicle seat according to claim 7, wherein each gear unit comprises:

a shaft aligned with the first drive axle of the first electric motor and operatively connected thereto; and a worm gear unit which is operatively connected on a first side to the shaft and, on a second side, to a spindle element arranged within one of the slide rails, wherein the spindle element is operatively connected to a driver element rigidly connected to one of the guide rails.

9. The vehicle seat according to claim 1, wherein the rotational adjustment device is designed free of a connection to the lower part.

10. The vehicle seat according to claim 1, wherein the rotational adjustment device has a primary gear unit, which is mechanically operatively connected on a drive side to a second electric motor and, on an output side, to a secondary gear unit, wherein the secondary gear unit is arranged to be mechanically operatively connected to a rotary plate unit of the rotational adjustment device which is rotatably mounted with respect to the lower part and rigidly connected to the upper part, and wherein the secondary gear unit comprises a self-contained ribbon-shaped force transmission, which interacts with a circumference of the rotary plate unit, and which can be conveyed in a direction of its circumference by the second electric motor.

* * * * *